US009303552B2

(12) United States Patent
Ozolins et al.

(10) Patent No.: US 9,303,552 B2
(45) Date of Patent: Apr. 5, 2016

(54) DIESEL ENGINE AND TRANSVERSE TURBOCHARGER

(71) Applicant: GENERAL ELECTRIC COMPANY, Schenectady, NY (US)

(72) Inventors: Jason Ozolins, Lawrence Park, PA (US); Mahantesh Navalagund, Bangalore (IN); Charles B. Atz, New Castle, PA (US); Vijayaselvan Jayakar, Bangalore (IN); Senthilkumar Anandhakrishnan, Bangalore (IN); Pratap Subhash Shitole, Bangalore (IN)

(73) Assignee: General Electric Company, Schenectady, NY (US)

( * ) Notice: Subject to any disclaimer, the term of this patent is extended or adjusted under 35 U.S.C. 154(b) by 82 days.

(21) Appl. No.: 14/143,757

(22) Filed: Dec. 30, 2013

(65) Prior Publication Data
US 2014/0182284 A1 Jul. 3, 2014

Related U.S. Application Data

(60) Provisional application No. 61/747,417, filed on Dec. 31, 2012.

(51) Int. Cl.
| F02B 33/44 | (2006.01) |
| F02D 23/00 | (2006.01) |
| F02B 33/00 | (2006.01) |
| F01D 25/24 | (2006.01) |
| F01D 25/28 | (2006.01) |
| F02B 29/04 | (2006.01) |
| F02B 37/00 | (2006.01) |

(Continued)

(52) U.S. Cl.
CPC ............ *F02B 29/0475* (2013.01); *F02B 37/00* (2013.01); *F02B 39/14* (2013.01); *F02B 67/10* (2013.01); *Y02T 10/144* (2013.01); *Y02T 10/146* (2013.01)

(58) Field of Classification Search
CPC ........ F02B 39/14; F02B 39/00; F02B 39/005; F02B 39/02; F02B 39/08; F02B 33/44; F02B 29/0475; F01D 25/28; F01D 25/24; F02M 2011/021
USPC ................. 123/563; 60/605.3, 598, 599, 602; 415/213.1
See application file for complete search history.

(56) References Cited

U.S. PATENT DOCUMENTS 3,027,706 A * 4/1962 Sprick ............................. 60/599
3,091,228 A * 5/1963 Maxwell ......................... 60/599
4,075,991 A * 2/1978 Mettig et al. ................... 123/563

(Continued)

FOREIGN PATENT DOCUMENTS

JP 06066146 A * 3/1994
JP 09236019 * 9/1997

(Continued)

OTHER PUBLICATIONS

English Translation of JP 09236019.*

(Continued)

*Primary Examiner* — Thomas Denion
*Assistant Examiner* — Jessica Kebea
(74) *Attorney, Agent, or Firm* — GE Global Patent Operation

(57) ABSTRACT

A turbocharger is mounted on a diesel engine (e.g., a marine diesel engine), with the turbocharger's turbine axis transverse to a crankshaft axis of the engine.

20 Claims, 5 Drawing Sheets

(51) Int. Cl.
*F02B 39/14* (2006.01)
*F02B 67/10* (2006.01)

(56) References Cited

U.S. PATENT DOCUMENTS

| | | | | |
|---|---|---|---|---|
| 4,674,284 | A * | 6/1987 | Kronogard et al. | 60/624 |
| 5,142,867 | A * | 9/1992 | Bergmann et al. | 60/612 |
| 5,440,881 | A * | 8/1995 | Sudmanns et al. | 60/612 |
| 5,791,144 | A * | 8/1998 | Thompson | 60/599 |
| 6,073,616 | A * | 6/2000 | Hedman | 123/563 |
| 6,125,799 | A * | 10/2000 | Van Son et al. | 123/41.31 |
| 6,409,558 | B1 * | 6/2002 | Gokan et al. | 440/89 R |
| 6,910,525 | B2 * | 6/2005 | Gokan et al. | 165/51 |
| 7,442,100 | B2 * | 10/2008 | Korhonen | B63H 5/08 440/1 |
| 7,806,110 | B1 * | 10/2010 | Broman et al. | 123/559.1 |
| 8,888,449 | B2 * | 11/2014 | Swenson et al. | 415/203 |
| 2002/0056444 | A1 * | 5/2002 | Chou et al. | 123/559.1 |
| 2005/0257521 | A1 * | 11/2005 | Anello | 60/602 |
| 2007/0199321 | A1 * | 8/2007 | Miura et al. | 60/599 |
| 2011/0253076 | A1 * | 10/2011 | Mikame et al. | 123/41.31 |

FOREIGN PATENT DOCUMENTS

| | | | |
|---|---|---|---|
| JP | 2002303145 A | * | 10/2002 |
| JP | 2010106699 A | * | 5/2010 |
| JP | 2010127073 A | * | 6/2010 |
| WO | WO 2010076383 A1 | * | 7/2010 |
| WO | 2012093200 A1 | | 7/2012 |

OTHER PUBLICATIONS

English Translation of JP 2010106699 A.*

* cited by examiner

US 9,303,552 B2

DIESEL ENGINE AND TRANSVERSE TURBOCHARGER

CROSS-REFERENCE TO RELATED APPLICATIONS

This application claims the benefit of U.S. Provisional Application Ser. No. 61/747,417, filed on Dec. 31, 2012, which is hereby incorporated by reference in its entirety.

BACKGROUND

1. Technical Field

Embodiments of the invention relate to engine systems. Other embodiments of the invention relate to turbocharged diesel engines.

2. Discussion of Art

Ships typically carry two types of diesel engines, namely, main propulsion engines and auxiliary engines. Both types of engine generate emissions of PM 2.5 (diesel soot), SO2 (sulfur dioxide), and NOx (nitrous oxides). Some government bodies, however, have adopted standards that will limit engine emissions, particularly NOx. For example, some of these standards apply to engines installed on U.S. vessels and to marine diesel fuels produced and distributed in the United States.

NOx emissions vary according to engine speed, combustion temperature, and the quantity of fuel burned. Lower speeds and higher combustion temperatures tend to raise the amount of NOx produced per quantity of fuel burned. As will be appreciated, low speed and high combustion temperature can be desirable characteristics of high-load internal combustion engines such as marine diesel propulsion engines. Therefore, the simplest path for reducing NOx emissions is to reduce the quantity of fuel burned per unit of useful power.

Turbochargers can be useful for enhancing fuel efficiency of piston-cylinder engines, by augmenting the mass and pressure of air inhaled into each cylinder during its intake stroke. However, turbochargers for marine diesel engines can be difficult to fit into the machinery space provided for the engines and their interfacing equipment.

As will be appreciated, it is desirable to minimize the machinery space within large ships, which are built to carry cargo. Therefore, it may be desirable to provide a marine diesel turbocharger arrangement that satisfies enhanced emissions standards, which is mounted and arranged in a more space-efficient manner than previously known, to avoid excessive use of machinery space.

BRIEF DESCRIPTION

In embodiments of a system, a turbocharger is mounted onto a diesel engine (e.g., a marine diesel engine) with a turbine axis of the turbocharger extending transverse to a crankshaft axis of the diesel engine. The turbine axis is a common axis of rotation of a turbine and a compressor of the turbocharger. (The turbocharger includes a main shaft, which is a component that connects the turbine and the compressor of the turbocharger along their common axis of rotation, i.e., along the turbine axis. Since the main shaft is coincident with the turbine axis, embodiments are equivalently described herein in regards to the main shaft of the turbocharger being oriented traverse to the crankshaft axis of the diesel engine. The main shaft of the turbocharger may define its longest dimension, and extends orthogonal to the radial width of the turbocharger.) The crankshaft axis is that axis along which the crankshaft of the diesel engine extends, typically the longest dimension of the diesel engine. "Transverse" as used herein means extending across in a generally orthogonal fashion, e.g., in an embodiment, perpendicular to one another (90 degrees plus or minus variances due to manufacturing tolerances), and in another embodiment, oriented ninety degrees plus or minus five degrees to one another. Transverse mounting of the turbocharger enables using a larger turbocharger than could be mounted axis-parallel within the same volume.

In another embodiment, a diesel engine system comprises a diesel engine (e.g., a marine diesel engine), a turbocharger mounted on the engine with a turbine axis of the turbocharger extending transverse to a crankshaft axis of the engine, and a bracket mounting the turbocharger on the engine. The system further comprises exhaust gas piping connected to supply exhaust gas from the engine to a turbine inlet of the turbocharger, charge air piping connected to supply charge air from a compressor outlet of the turbocharger with an aftercooler of the engine, and wastegate piping connected to supply exhaust gas from the engine to a turbine outlet of the turbocharger. A wastegate is installed in the wastegate piping for controlling the flow of exhaust gas to bypass the turbocharger.

DRAWINGS

The present invention will be better understood from reading the following description of non-limiting embodiments, with reference to the attached drawings, wherein below:

DETAILED DESCRIPTION

Figure 1:
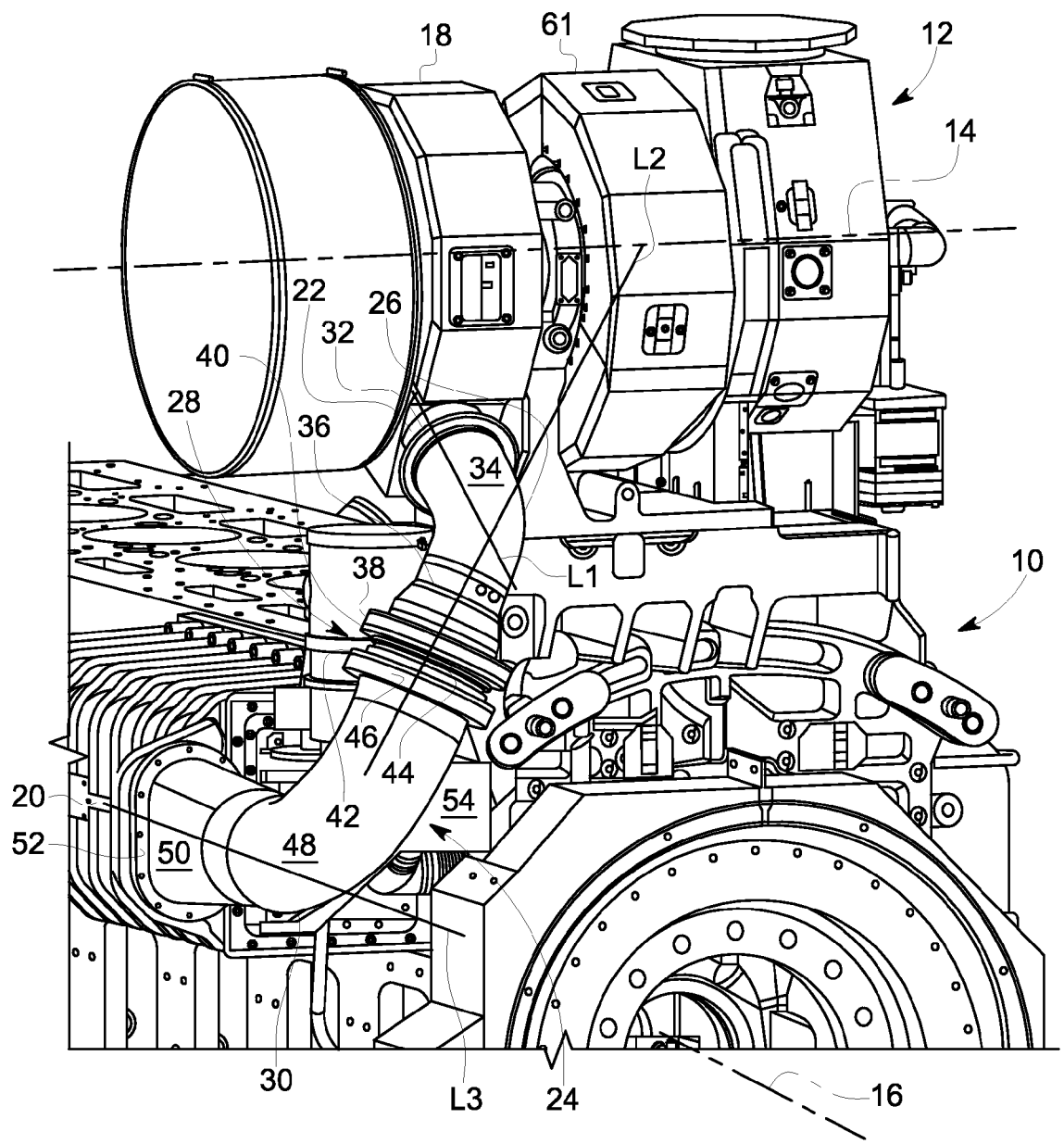
FIG. 1 shows in perspective view a turbocharger mounted transversely at a front end of a diesel engine, according to an embodiment of the invention.

Reference will be made below in detail to exemplary embodiments of the invention, examples of which are illustrated in the accompanying drawings. Wherever possible, the same reference characters used throughout the drawings refer to the same or like parts.

Figure 2:
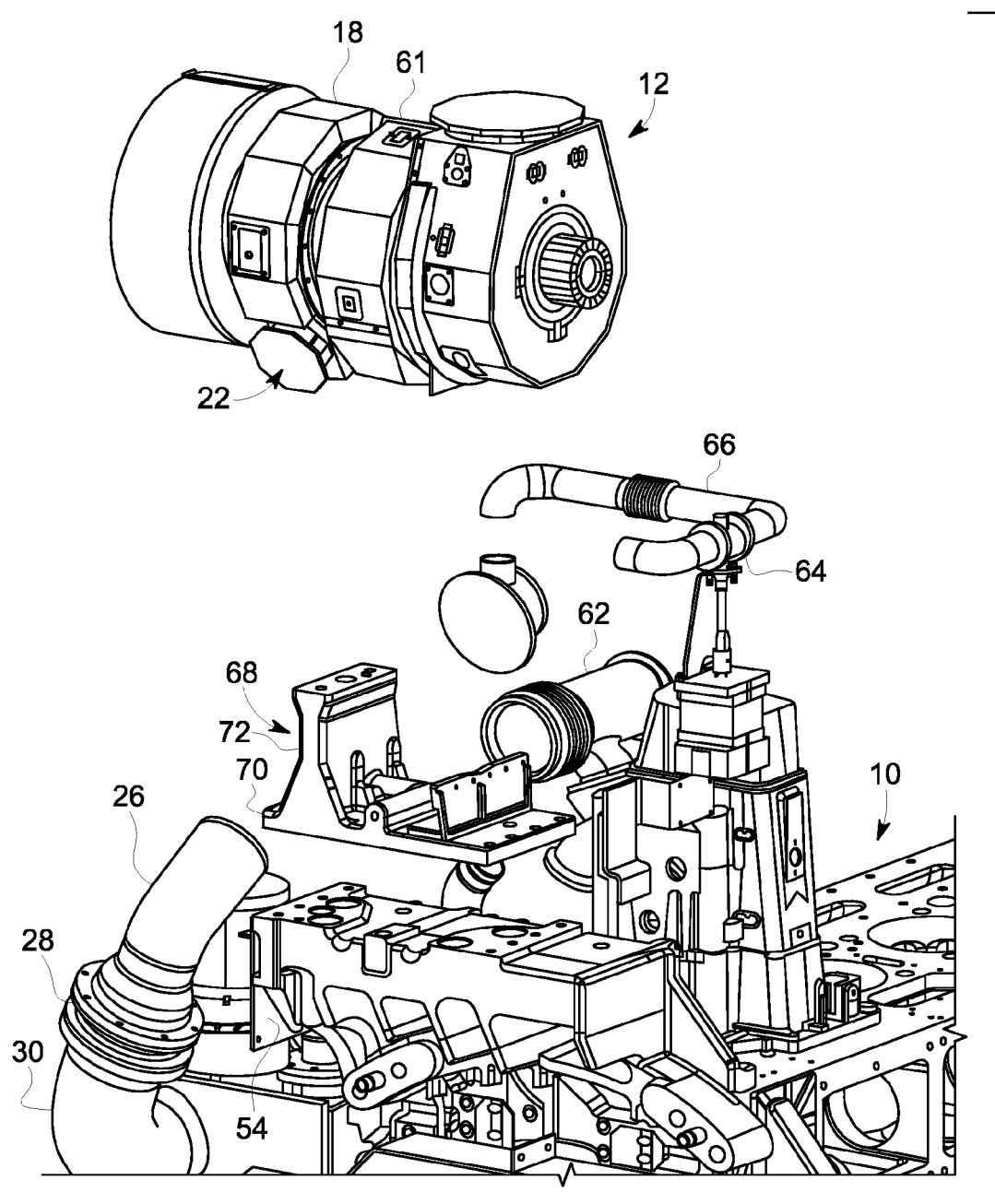
FIG. 2 shows an exploded view of FIG. 1.
Figure 3:
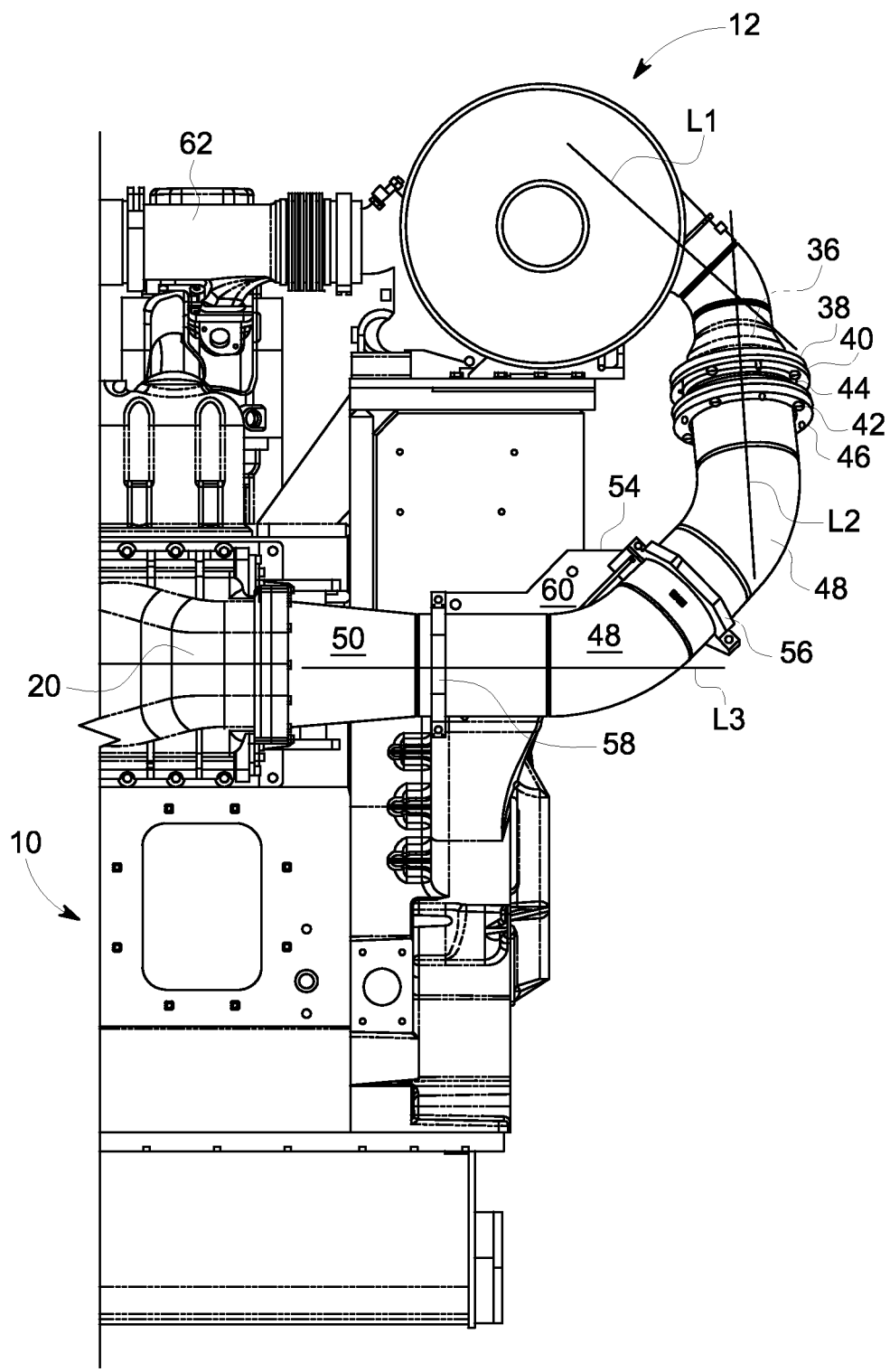
FIG. 3 shows a partial side elevation view of FIG. 1.

Referring to FIGS. 1-3, aspects of the invention relate to a system that includes a diesel engine 10 (e.g., a marine diesel engine) and a turbocharger 12 that is mounted with its turbine axis 14 transverse to a crankshaft axis 16 of the engine 10. The turbocharger 12 includes a compressor 18 for pressurizing intake air, and the diesel engine includes an aftercooler 20 for receiving the air pressurized by the compressor 18.

A compressor outlet 22 of the compressor 18 is connected with the aftercooler 20 by charge air piping 24, which extends from the compressor outlet 22 in a flow direction along a first line L1 that is angled (e.g., an angle greater than zero degrees, and less than 90 degrees, such as from 35 to 55 degrees) with reference to the crankshaft axis 16 in a plane substantially orthogonal to the turbine axis 14, then along a second line L2 that is angled (e.g., an angle greater than zero degrees, and less than 90 degrees, such as from 35 to 55 degrees, or, in other embodiments where this portion of the charge air piping is to be oriented more towards the vertical, from 45 to 75 degrees) with reference to the turbine axis 14 in a plane substantially orthogonal to the crankshaft axis 16, and then along a third line L3 that is substantially parallel to the crankshaft axis 16 and ending at the aftercooler 20. ("Flow direction" refers to a direction of gas flow in an engine system when it is operating according to its intended design. For example, in an engine system comprising an engine and turbocharger, the flow direction may include and extend from a main intake, through a compressor of the turbocharger, through an intake manifold of the engine, through engine cylinders, out an engine exhaust, into a turbine of the turbocharger, and out an exhaust stack.) The charge air piping 24 includes a first portion 26 that connects to the compressor outlet 22, an expansion portion 28 (including, e.g., an o-ring slip joint or a bellows) that continues from the first portion 26, and a third portion 30 that connects the expansion portion 28 to the aftercooler 20. In embodiments, an axis of the first portion 26 defines the first line L1 referred to above, an axis of the second portion defines the second line L2 referred to above, and an axis of the third portion 30 defines the third line L3 referred to above.

The first line is shown at L1 in FIG. 3. Note that in this view, the turbine axis 14 is orthogonal to the plane of the view. The first line L1 is angled with respect to the crankshaft axis 16, i.e., the angle would be defined by where the first line L1 intersects the crankshaft axis 16, which is omitted from this view for space purposes. The second and third lines are shown at L2 and L3, respectively, in FIG. 1.

Figure 6:
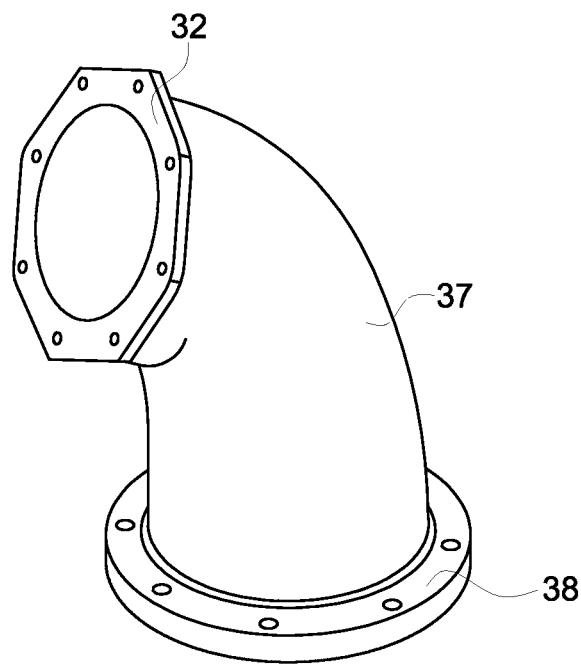
FIG. 6 shows in perspective view a duct piece, for use in the turbocharger arrangement of FIG. 1, according to another embodiment of the invention.

The first portion 26 of the charge air piping 24 includes an inlet flange 32 that is attached to the compressor outlet 22, and also includes a constant flow area first bend 34 that extends in the flow direction from the flange 32. ("Constant flow area" indicates that a cross-sectional area, interior to the piping and orthogonal to the piping centerline, is constant throughout the length of the first bend 34.) Continuing in the flow direction from the first bend 34, the first portion 26 also includes a frustoconical segment 36 that is attached to the first bend at an end opposite the inlet flange 32. This frustoconical segment 36 diminishes in flow area as it extends in the flow direction from the first bend 34 to a flange 38, which ends the first portion 26. The first portion 26 is attached by the flange 38 to the expansion portion 28. In an alternate design, in place of the constant area first bend 34 and the frustoconical segment 36, a single continuously-tapering casting 37 may be provided, as shown in FIG. 6. The continuously-tapering casting 37 is of a lesser flow area adjacent the flange 32 and is of a greater flow area adjacent the flange 38, such that the flow area of the casting increases from the compressor outlet toward the expansion joint 28.

Referring back to FIGS. 1-3, the expansion portion 28 includes a first flange 40 that is secured to the first portion 26, a second flange 42 that is secured to the third portion 30, and an expansion joint 44 (e.g., a bellows or a sliding o-ring slip joint) that is connected between the first and second flanges 40, 42.

The third portion 30 includes a flange 46 that is attached to the second flange 42 of the expansion portion 28. Continuing in a flow direction from the second flange 46, the third portion 30 also includes a constant flow area second bend 48, a flared oblong piece 50, and a discharge flange 52, which is connected to the aftercooler 20.

The charge air piping 24 is mounted to the engine 10 by a duct bracket 54. The duct bracket 54 includes a first ring 56 (see FIG. 3) that is fastened around a middle part of the second bend 48, a second ring 58 that is fastened around the junction of the second bend 48 with the flared oblong piece 50, and a brace 60 that rigidly connects the first and second rings. The brace 60 is attached to the engine 10.

The turbocharger 12 is driven by a turbine 61, which receives exhaust gas from the engine 10 via exhaust gas piping 62 that is connected from an exhaust manifold of the engine to an inlet of the turbine. The turbocharger can be bypassed or de-powered by operating a wastegate valve or other control element 64 (generally referred to as a wastegate), which is installed in wastegate piping 66 that is connected from the exhaust manifold to an outlet of the turbine. The wastegate 64 is operable between one or more open positions that permit at least some exhaust gas to bypass the turbocharger turbine, and a closed position that prevents exhaust gas bypassing the turbocharger turbine through the wastegate piping. In one embodiment, in one of the positions of the wastegate 64 where exhaust gas can bypass the turbocharger turbine, all the exhaust gas bypasses the turbine, and the turbocharger is de-powered. In other embodiments, in a fully open position of the wastegate, some exhaust gas nevertheless does not bypass the turbine. In other embodiments, the wastegate is controllable from the closed position, where no exhaust gas bypasses the turbine through the wastegate piping, to a fully open position, where a maximum amount of exhaust gas bypasses the turbine through the wastegate piping, to plural intermediate positions where amounts between the two (at least some but less than the maximum) of exhaust gas bypass the turbine through the wastegate piping.

Figure 4:
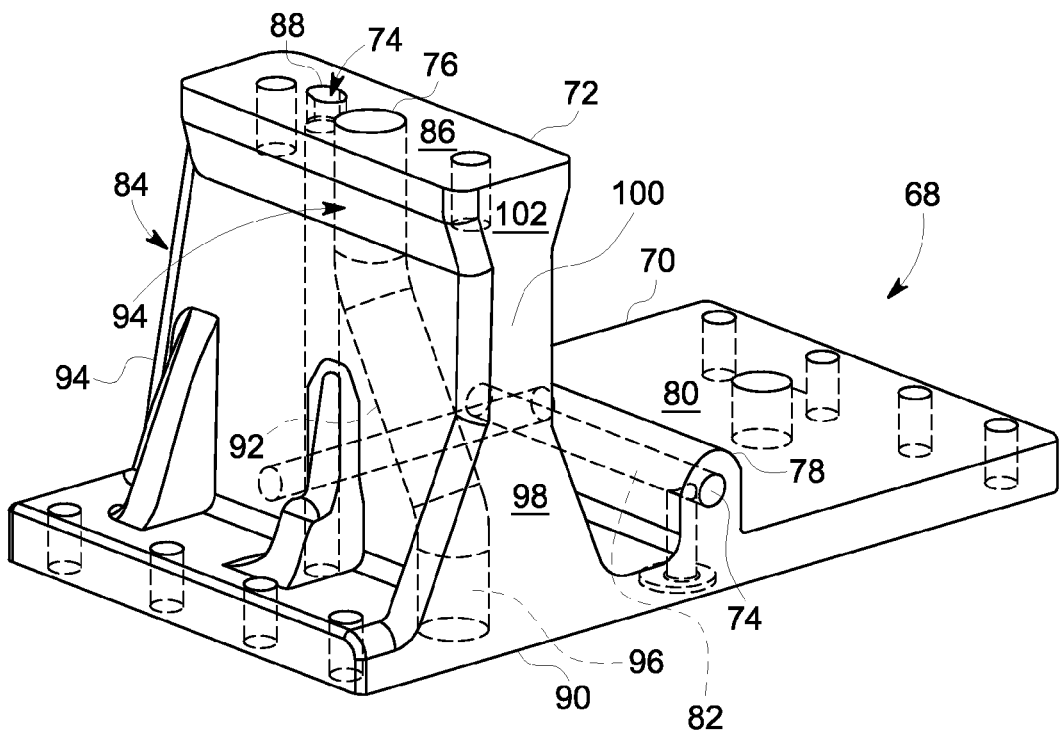
FIG. 4 shows in perspective view a turbocharger mounting bracket, according to an embodiment of the invention.
Figure 5:
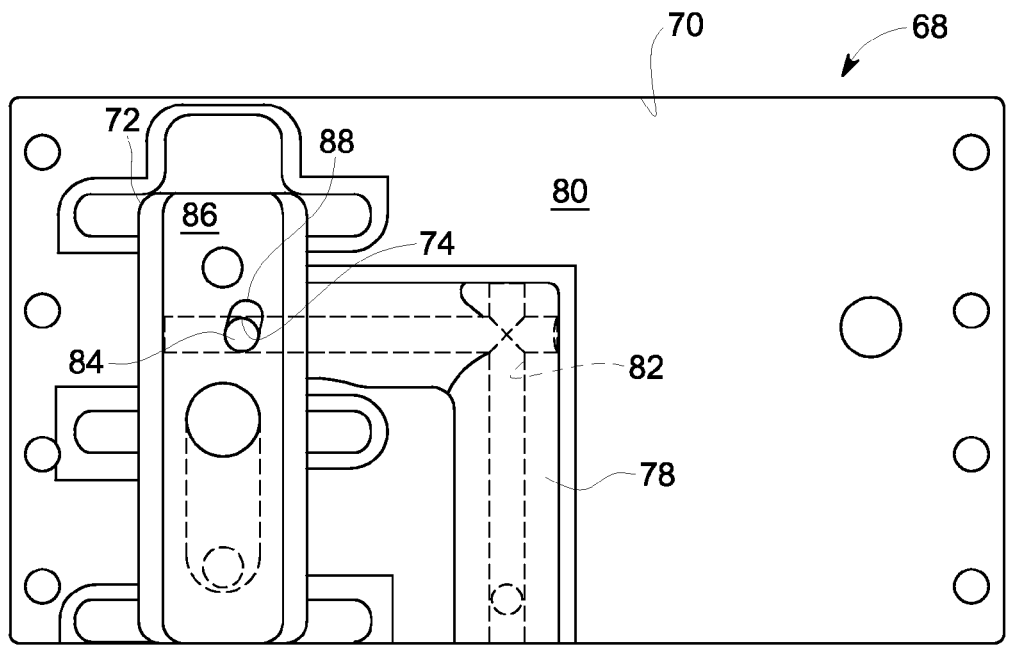
FIG. 5 shows a plan view of FIG. 4.

The turbocharger 12 is mounted to the engine 10 by a turbocharger bracket 68, which includes a base plate 70 and a flange 72 that protrudes upward from the base plate. Referring to FIGS. 4-5, the turbocharger bracket 68 includes a first internal passage 74 for supplying oil from the engine 10 to the turbocharger 12, and includes a second internal passage 76 for draining oil from the turbocharger to the engine.

In embodiments, the first internal passage 74 is formed partly in the flange 72 and partly in a rib 78, which protrudes from the upward surface 80 of the base plate 70. Within the rib 78, a first segment 82 of the first internal passage 74 extends from a side 84 of the base plate 70 across the base plate, then along the base plate to the flange 72. Within the flange 72, the first internal passage 74 then extends vertically from the first segment 82 to a top surface 86 of the flange. At the flange top surface 86, the first internal passage 74 opens from a generally circular cross section onto an oblong slot 88. The oblong slot 88 is of moderate depth and can be removed by simply removing or machining off a certain thickness of material from the flange top surface 86. Removal of the oblong slot 88 reveals the generally circular opening of the first internal passage 74. Thus, in an unmachined condition, the turbocharger bracket 68 includes the oblong slot 88, which connects the opening of the first internal passage 74 with a designed position of an oil inlet of a first variant of the turbocharger 12. In a machined condition, the turbocharger bracket 68 does not include the oblong slot 88, such that the generally circular opening of the first internal passage 74 is aligned with a designed position of an oil inlet of a second variant of the turbocharger 12.

The second internal passage 76 is formed within the flange 72 and extends from the top surface 86 to a bottom surface 90 of the base plate 70. The second internal passage 76 includes a dogleg segment 92, which enables an upper segment 94 to be horizontally offset from a lower segment 96.

The flange 72 of the turbocharger bracket 68 includes a body 98 that is contiguous with the base plate 70. The body 98 tapers upward from the base plate to a neck 100, which extends to a head 102. The head 102 is flared outward, such that removing material from the flange top surface 86 will markedly reduce the width of the head 102.

Although embodiments are described herein with respect to the engine having an aftercooler (which receives the charge air from the output of the turbocharger compressor), in other embodiments, the engine is not so equipped. Thus, in one embodiment more generally, where an engine may or may not have an aftercooler, a diesel engine system comprises a diesel engine (e.g., marine diesel engine) and a turbocharger that is mounted with a turbine axis of the turbocharger transverse to a crankshaft axis of the engine. The turbocharger includes a compressor and the engine includes an intake air manifold. A compressor outlet of the compressor is connected with the intake air manifold by a charge air piping extending from the compressor outlet along a first line angled with reference to the crankshaft axis in a first plane substantially orthogonal to the turbine axis, then along a second line angled with reference to the turbine axis in a second plane substantially orthogonal to the crankshaft axis, and then along a third line substantially parallel to the crankshaft axis and ending at the intake air manifold. In embodiments, the charge air piping includes a first portion that connects to the compressor outlet, an expansion portion that extends generally orthogonal from the first portion, and a third portion that extends generally orthogonal from the expansion portion to the intake air manifold.

In embodiments, the turbocharger is mounted above the engine, e.g., the turbocharger is mounted above at least the engine crankshaft and aftercooler and/or intake air manifold of the engine.

In embodiments, a diesel engine system comprises a diesel engine (e.g., marine diesel engine) and a turbocharger as set forth herein, and both charge air piping and a bracket for mounting the turbocharger to the engine as set forth herein.

In embodiments, a turbocharger is mounted on a diesel engine with a turbine axis of the turbocharger transverse to a crankshaft axis of the engine. The turbocharger includes a compressor and the diesel engine includes an aftercooler. A compressor outlet of the compressor is connected with the aftercooler by charge air piping, which extends from the compressor outlet along a first line angled with reference to the engine axis in a plane substantially orthogonal to the turbocharger axis, then along a second line angled with reference to the turbocharger axis in a plane substantially orthogonal to the engine axis, and then along a third line substantially parallel to the engine axis and ending at the intake air manifold. The charge air piping includes a first portion that connects to the compressor outlet, a expansion portion that extends generally orthogonal from the first portion, and a third portion that extends generally orthogonal from the expansion portion to the aftercooler. The first portion of the charge air piping includes an inlet flange that is attached to the compressor outlet, a constant flow area first bend that continues in a flow direction from the inlet flange, a frustoconical segment that continues in the flow direction from the first bend, and a second flange that connects the frustoconical segment to the expansion portion of the charge air piping. (In other embodiments, the first portion of the charge air pipin includes an inlet flange that is attached to the compressor outlet, a continuously expanding tapered portion that continues in a flow direction from the inlet flange, and a second flange that connects the continuously expanding tapered portion to the expansion portion of the charge air piping.) The expansion portion of the charge air piping includes a first flange that is secured to the first portion of the charge air piping, a second flange that is secured to the third portion of the charge air piping, and an expansion joint that is connected between the first and second flanges. The third portion of the charge air piping includes a second flange that is secured to the expansion portion of the charge air piping, a constant flow area second bend disposed in a flow direction from the second flange, a flared oblong piece disposed in the flow direction from the second bend, and a discharge flange attaching the flared oblong piece to the aftercooler. A duct bracket secures the charge air piping to the engine. The duct bracket includes a first ring fastened at a middle part of the second bend of the charge air piping, a second ring fastened at the junction of the second bend with the flared oblong portion of the charge air piping, and a brace connecting the first and second rings. The brace is fastened to the engine. Additionally, a turbocharger bracket mounts the turbocharger to the engine. The turbocharger bracket includes a base plate and a flange protruding upward from the base plate, with a first internal passage formed in the bracket for supplying oil from the engine to the turbocharger and with a second internal passage formed in the bracket for draining oil from the turbocharger to the engine. The first internal passage is formed partly in the flange and partly in a rib protruding from an upward surface of the base plate. A first portion of the first internal passage extends within the rib from a side of the base plate across the base plate, then along the base plate to the flange. A second portion of the first internal passage extends vertically through the flange from the first portion of the first internal passage to a top surface of the flange. The second internal passage extends vertically from a lower surface of the base plate to a top surface of the flange. The second internal passage includes a dogleg segment. In certain embodiments, the diesel engine is a marine diesel engine installed in a marine vessel.

In other embodiments, a diesel engine has a turbocharger mounted on the engine with its shaft extending transverse to a crankshaft axis of the engine. A bracket mounts the turbocharger on the engine. Exhaust gas piping is connected to supply exhaust gas from the engine to a turbine inlet of the turbocharger. Charge air piping is connected to supply charge air from a compressor outlet of the turbocharger with an aftercooler of the engine. Wastegate piping is connected to supply exhaust gas from the engine to a turbine outlet of the turbocharger, with a wastegate valve installed in the wastegate piping for permitting or preventing exhaust gas to bypass the turbocharger.

In embodiments of a system, a diesel engine (e.g., marine diesel engine) is provided with a bracket, exhaust transition piping, charge air piping, and wastegate piping for mounting a turbocharger with its turbine axis (main shaft) transverse to the crankshaft axis of the diesel engine. The bracket includes a bottom plate and an upright flange protruding generally orthogonally from the bottom plate. An upper edge of the flange includes bolt holes for mounting the turbocharger. The exhaust transition piping extends generally axially from an exhaust manifold of the engine, to a downward bend that ends at a flange for attachment to a turbine inlet of the turbocharger. The charge air piping is attached by a flange to a compressor outlet of the turbocharger, and extends generally downward from the flange, then generally axially to a side cover of the engine (e.g., an aftercooler cover). The wastegate piping extends from the exhaust transition piping to a turbine outlet of the turbocharger, and includes a wastegate (e.g., valve or other flow control device) that can be controlled to vary an amount of exhaust gas bypassing the turbocharger turbine (e.g., the wastegate can be fully opened for a maximum amount of exhaust gas to bypass the turbine, fully closed for no exhaust gas to bypass the turbine, or partially opened for an amount of exhaust gas less than the maximum to bypass the turbine).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described embodiments, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A diesel engine system, comprising:
   a diesel engine; and
   a turbocharger that is mounted with a turbine axis of the turbocharger transverse to a crankshaft axis of the engine;
   wherein the turbocharger includes a compressor and the engine includes an aftercooler, a compressor outlet of the compressor being connected with the aftercooler by a charge air piping extending from the compressor outlet along a first line angled with reference to the crankshaft axis in a first plane orthogonal to the turbine axis, then along a second line angled with reference to the turbine axis in a second plane orthogonal to the crankshaft axis, and then along a third line parallel to the crankshaft axis and ending at an intake air manifold of the aftercooler;
   wherein the charge air piping includes a first portion that connects to the compressor outlet, an expansion portion that extends orthogonal from the first portion, and a third portion that extends orthogonal from the expansion portion to the aftercooler; and
   wherein the third portion of the charge air piping includes a second flange that is secured to the expansion portion of the charge air piping, a constant flow area second bend disposed in a flow direction from the second flange, a flared oblong piece disposed in the flow direction from the second bend, and a discharge flange attaching the flared oblong piece to the aftercooler.

2. The diesel engine system of claim 1, further comprising a duct bracket for securing the charge air piping to the engine, said duct bracket including a first ring fastened at a middle part of the second bend of the charge air piping, a second ring fastened at the junction of the second bend with the flared oblong portion of the charge air piping, and a brace connecting the first and second rings, the brace being fastened to the engine.

3. A marine vessel comprising the diesel engine system of claim 1.

4. The diesel engine system of claim 1, wherein the turbocharger is mounted above at least the intake air manifold and crankshaft axis of the engine.

5. A diesel engine system, comprising:
   a diesel engine;
   a turbocharger that is mounted with a turbine axis of the turbocharger transverse to a crankshaft axis of the engine; and
   a bracket mounting the turbocharger to the engine, said bracket including a base plate and a flange protruding upward from the base plate, with a first internal passage formed in the bracket for supplying oil from the engine to the turbocharger and with a second internal passage formed in the bracket for draining oil from the turbocharger to the engine;
   wherein the turbocharger includes a compressor and the engine includes an aftercooler, a compressor outlet of the compressor being connected with the aftercooler by a charge air piping extending from the compressor outlet along a first line angled at greater than zero degrees and less than 90 degrees with reference to the crankshaft axis in a first plane orthogonal to the turbine axis, then along a second line angled with reference to the turbine axis in a second plane orthogonal to the crankshaft axis, and then along a third line parallel to the crankshaft axis and ending at an intake air manifold of the aftercooler; and
   wherein the first internal passage is formed partly in the flange and partly in a rib protruding from an upward surface of the base plate.

6. The diesel engine system of claim 5, wherein the charge air piping includes a first portion that connects to the compressor outlet, an expansion portion that extends orthogonal from the first portion, and a third portion that extends orthogonal from the expansion portion to the aftercooler.

7. The diesel engine system of claim 6, wherein the first portion of the charge air piping includes an inlet flange that is attached to the compressor outlet, a constant flow area first bend that continues in a flow direction from the inlet flange, a frustoconical segment that continues in the flow direction from the first bend, and a second flange that connects the frustoconical segment to the expansion portion of the charge air piping.

8. The diesel engine system of claim 6, wherein the first portion of the charge air piping includes an inlet flange that is attached to the compressor outlet, a continuously expanding tapered portion that continues in a flow direction from the inlet flange, and a second flange that connects the continuously expanding tapered portion to the expansion portion of the charge air piping.

9. The diesel engine system of claim 6, wherein the expansion portion of the charge air piping includes a first flange that is secured to the first portion of the charge air piping, a second flange that is secured to the third portion of the charge air piping, and an expansion joint that is connected between the first and second flanges.

10. The diesel engine system of claim 5, wherein the second internal passage extends vertically from a lower surface of the base plate to a top surface of the flange.

11. The diesel engine system of claim 10, wherein the second internal passage includes a dogleg segment.

12. The diesel engine system of claim 5, wherein the diesel engine is a marine diesel engine installed in a marine vessel.

13. The diesel engine system of claim 5, wherein the turbocharger is mounted above at least the intake air manifold and crankshaft axis of the engine.

14. The diesel engine system of claim 5, wherein the charge air piping includes a first portion that connects to the compressor outlet, an expansion portion that extends orthogonal from the first portion, and a third portion that extends orthogonal from the expansion portion to the intake air manifold.

15. The diesel engine system of claim 5, wherein:
the first line is angled between 35 degrees to 55 degrees with reference to the crankshaft axis.

16. A marine vessel comprising the diesel engine system of claim 5.

17. A diesel engine system, comprising:
a diesel engine;
a turbocharger that is mounted with a turbine axis of the turbocharger transverse to a crankshaft axis of the engine; and
a bracket mounting the turbocharger to the engine, said bracket including a base plate and a flange protruding upward from the base plate, with a first internal passage formed in the bracket for supplying oil from the engine to the turbocharger and with a second internal passage formed in the bracket for draining oil from the turbocharger to the engine;
wherein the first internal passage is formed partly in the flange and partly in a rib protruding from an upward surface of the base plate;
wherein a first portion of the first internal passage extends within the rib from a side of the base plate across the base plate, then along the base plate to the flange.

18. The diesel engine system of claim 17, wherein a second portion of the first internal passage extends vertically through the flange from the first portion of the first internal passage to a top surface of the flange.

19. A marine vessel comprising the diesel engine system of claim 17.

20. The diesel engine system of claim 17, wherein the turbocharger is mounted above at least the crankshaft axis of the engine.

* * * * *